United States Patent
Hrovat et al.

[11] Patent Number: 6,070,119
[45] Date of Patent: May 30, 2000

[54] CLUTCH PRESSURE CONTROL FOR IMPROVED TRANSMISSION ENGAGEMENTS AND SHIFTS

[75] Inventors: Davorin David Hrovat, Ann Arbor; Jahanbakhsh Asgari, Dearborn, both of Mich.

[73] Assignee: Ford Global Technologies, Inc., Dearborn, Mich.

[21] Appl. No.: 09/235,790

[22] Filed: Jan. 22, 1999

[51] Int. Cl.[7] .............................. G06F 17/00; F16H 61/00
[52] U.S. Cl. .............................. 701/67; 701/65; 477/168; 477/174
[58] Field of Search .................. 701/67, 65; 477/168, 477/174; 192/58.62

[56] References Cited

U.S. PATENT DOCUMENTS

| | | | |
|---|---|---|---|
| 4,509,124 | 4/1985 | Suzuki et al. | 701/65 |
| 4,779,489 | 10/1988 | Haley | 74/844 |
| 5,024,125 | 6/1991 | Baba | 74/866 |
| 5,050,451 | 9/1991 | Hussain | 74/844 |
| 5,058,014 | 10/1991 | Saitou et al. | 701/60 |
| 5,216,606 | 6/1993 | Lentz et al. | 701/66 |
| 5,307,269 | 4/1994 | Kohno | 701/68 |
| 5,421,791 | 6/1995 | Futawatari | 475/117 |
| 5,558,597 | 9/1996 | Oba et al. | 477/98 |
| 5,611,752 | 3/1997 | Kamada et al. | 477/98 |
| 5,692,991 | 12/1997 | Iwata et al. | 477/98 |
| 5,743,826 | 4/1998 | Usuki et al. | 477/98 |
| 5,762,581 | 6/1998 | Kozaki et al. | 477/174 |

FOREIGN PATENT DOCUMENTS 64-35153  2/1989  Japan .
5-272555 10/1993  Japan .

Primary Examiner—Michael J. Zanelli
Assistant Examiner—Eric M Gibson
Attorney, Agent, or Firm—James J. Dottavio

[57] ABSTRACT

A method for reducing transmission clutch engagement pressure during conditions when clutch hydraulic fluid is relatively more viscous. A clutch engagement pressure control signal is shaped by a system that has an addition branch (42) for shaping the control signal as the control signal is rising, a subtraction branch (44) for shaping the control signal as the control signal is falling, and a summing junction (46) for algebraically summing the signal outputs of the addition and the subtraction branches.

7 Claims, 2 Drawing Sheets

2

CLUTCH PRESSURE CONTROL FOR IMPROVED TRANSMISSION ENGAGEMENTS AND SHIFTS

BACKGROUND OF THE INVENTION

1. Field of the Invention

This invention relates generally to automotive vehicles in which an engine delivers torque to driven wheels via a transmission having a clutch whose engagement pressure is controlled by a control signal. More specifically it relates to improvements in transmission clutch engagement pressure control during conditions when hydraulic fluid that interfaces driving and driven elements of the clutch is relatively more viscous, such as during vehicle warm-up.

2. Background Information

Certain vehicle transmissions employ "wet" clutches in which hydraulic fluid interfaces driving and driven clutch members. It has been observed that engine torque requirements can be significantly larger when the hydraulic fluid is relatively more viscous, such as at initial clutch engagement after engine starting. Hydraulic fluid is generally more viscous at lower temperatures (at and below 10°C.–20°C. for example), and so viscous effects may become more pronounced at lower temperatures. As temperature increases, hydraulic fluid becomes less viscous; consequently, viscous effects on a wet clutch tend to dissipate with increasing temperature. In extreme conditions, viscous effects may sufficiently influence torque production that engagement of a wet clutch can cause noticeably poor shifting and engagement, and perhaps even engine stalling.

Several approaches to the problem of compensating viscosity torque have modeled torque production in order to deduce desired graph plots of torque and clutch engagement pressure during clutch engagement. Results can be stored in the form of pressure vs. torque curves parameterized by variables such as temperature and initial change in rotational speed. However such approaches may be deemed somewhat complex and still subject to some degree of uncertainty due to unit-to-unit variability.

A preliminary novelty search in connection within this invention developed the following U.S. Pat. Nos. 4,509,124; 4,779,489; 5,024,125; 5,050,451; 5,058,014; 5,216,606; 5,307,269; 5,558,597; 5,692,911; and 5,743,826. Also developed were Japan patent publication Nos: 40103515153 (February 1989) and 405272555 (October 1993).

SUMMARY OF THE INVENTION

The present invention relates to improvements in clutch engagement pressure control that are effective to reduce the influence of hydraulic fluid viscosity in a wet clutch during engagements that occur when the hydraulic fluid that interfaces driving and driven clutch elements is relatively more viscous, such as at first engagement after starting an engine and/or at relatively lower temperatures. In a clutch in which the engagement pressure is controlled by a control signal, the improvements are created by attenuating the control signal for engagements that occur under such conditions. More specifically, where the control signal is an electric one, it is attenuated by employing an algorithm that calculates a reduction in clutch engagement pressure.

Other general and more specific aspects will be set forth in the ensuing description and claims.

BRIEF DESCRIPTION OF THE DRAWINGS

The drawings that will now be briefly described are incorporated herein to illustrate a preferred embodiment of the invention and a best mode presently contemplated for carrying out the invention.

DESCRIPTION OF THE PREFERRED EMBODIMENT(S)

Figure 1:
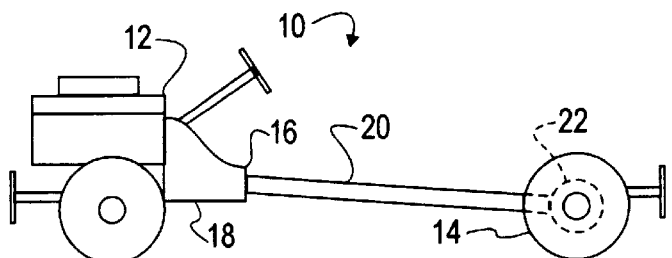
FIG. 1 is a diagrammatic view of a chassis of an automotive vehicle embodying principles of the present invention.

FIG. 1 shows an example of a chassis of an automotive vehicle 10 incorporating principles of the present invention. It should be understood that the illustration of the Figure is intended to be representative of any of various chassis configurations and not necessarily limited to the rear wheel drive configuration that happens to be shown.

Vehicle 10 comprises an internal combustion engine 12 that delivers torque to driven rear wheels 14 through a drivetrain 16. Drivetrain 16 includes a transmission 18 having an input coupled to a power output shaft of engine 12 and an output that is coupled through a driveshaft 20 and a rear axle 22 to wheels 14.

An example of transmission 18 is a multi-gear transmission which contains an automatic shift mechanism providing various drive ratios between engine 12 and wheels 14. Power flow through transmission 18 passes through an internal clutch or band mechanism having selectively engageable driving and driven members. When the clutch is engaged, engine torque is delivered through the clutch in a particular drive ratio to wheels 14. When the clutch is disengaged, no engine torque is delivered to wheels 14.

Certain transmissions employ "wet" clutches in which hydraulic fluid interfaces the driving and driven clutch members. The present invention is a result of a recognition that the hydraulic fluid interface can create a significant addition to torque imposed on an engine during times when hydraulic fluid is relatively more viscous, although the particular physical phenomena that give rise to such viscous torque may not be fully understood. Such conditions include relatively lower temperatures and first clutch engagements after starting an engine. As the hydraulic fluid heats up, and after first engagement, reduced viscosity of hydraulic fluid at the interface between driving and driven clutch members imposes less torque on an engine.

Figure 2:
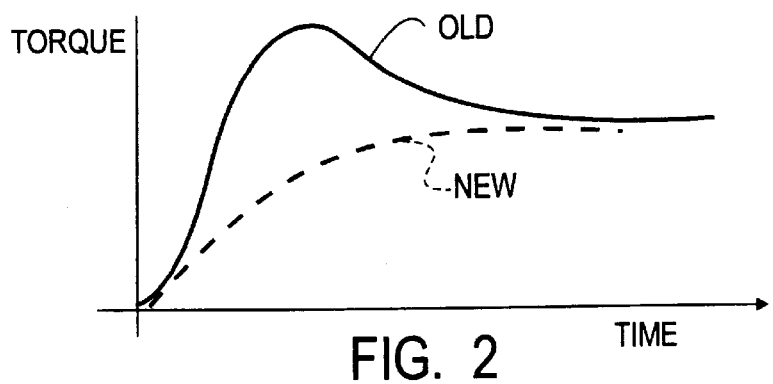
FIG. 2 is a first generalized graph plot useful in explaining the inventive principles.

The effect of viscosity torque can be observed graphically, as in FIG. 2. The graph plot labeled "old" is representative of a first clutch engagement. During that engagement process, torque increases to a peak and then decays to a fairly steady value in response to clutch engagement pressure represented by the graph plot labeled "old" in FIG. 3. Clutch engagement pressure is applied by any suitable mechanism, which may be electromechanical or electrohydraulic by way of example. Such a mechanism produces an engagement pressure output that is a function of an input control signal, an electric control signal for example. Varying the electric control signal varies the clutch engagement pressure.

The graph plot labeled "new" in FIG. 2 represents a torque that, as a clutch engagement is occurring, does not exceed the final steady state value as the torque load is rising. Hence unlike the graph plot labeled "old" in the same Figure, the "new" torque graph plot avoids creating torque overshoot as the engagement proceeds. By avoiding such overshoot, improved shifting can be achieved, and possible engine stalling due to excessive viscosity torque may be avoided.

Figure 3:
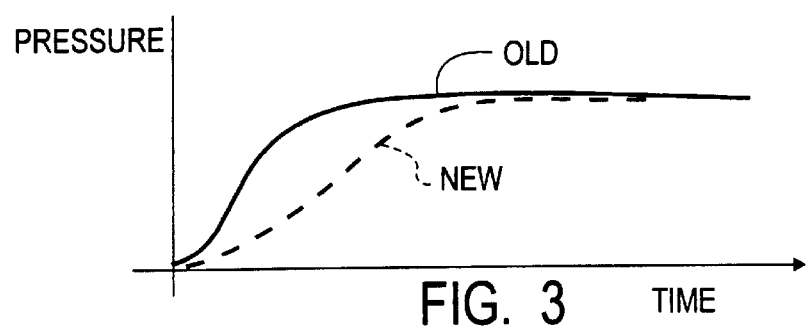
FIG. 3 is a second generalized graph plot useful in explaining the inventive principles.

In order to create a "new" torque characteristic like that labeled as such in FIG. 2, the engagement pressure is controlled in accordance with a corresponding graph plot labeled "new" in FIG. 3. Certain aspects of the inventive principles relate to development of that graph plot for controlling engagement pressure, and it therefore now becomes appropriate to consider FIGS. 4 and 5.

Figure 4:
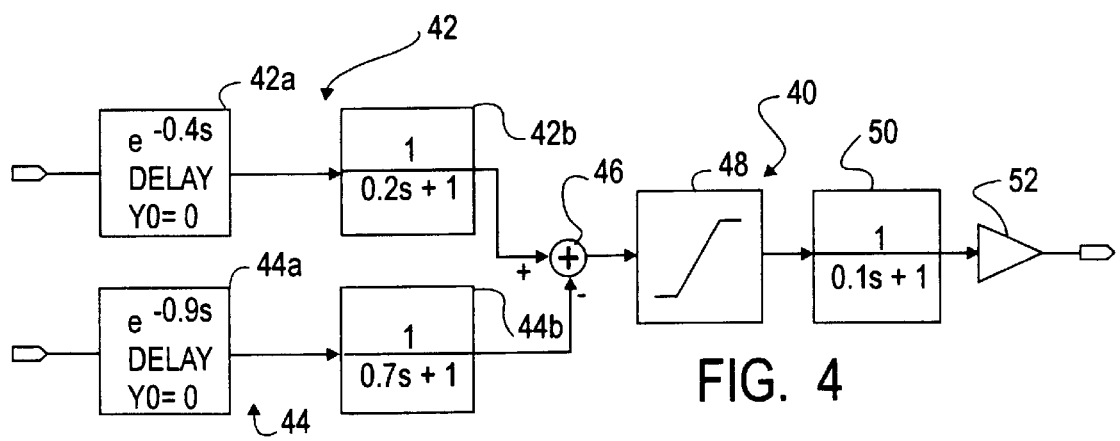
FIG. 4 is a schematic block diagram of a representative hardware implementation of the inventive principles.

FIG. 4 discloses in block diagram form the organization and arrangement of an electronic control 40 that forms a model for developing an electric signal input that can control clutch engagement pressure in the manner desired. Control 40 comprises an addition branch 42, a subtraction branch 44, and a summing junction 46. Addition branch 42 comprises the representative functions shown in blocks 42a, 42b for shaping the control signal during time that a graph plot of torque vs. time is rising. Subtraction branch 44 comprises the representative functions shown in blocks 44a, 44b for shaping the control signal during time that a graph plot of torque vs. time is falling. Outputs of the two branches 42, 44 are algebraically summed by summing junction 46. That algebraic summation is passed through a limiter 48 to a low pass filter 50 whose output is then amplified by an amplifier 52. The ability of control 40 to provide a model capable of developing desired engagement pressure that can reduce the effect of viscosity torque has been demonstrated by actual testing.

Development of a successful clutch engagement pressure control strategy utilizing control 40 is premised on certain relationships and assumptions. One relationship is that total torque is equal to the sum of asperity torque and viscous torque. An initial assumption, for implementing the disclosed strategy, is that 100% of the torque is "asperity" (i.e., non-viscous) torque. Utilizing that assumption and the relationship:

$$\tau_a = \mu_f A_f P$$

an additional torque is calculated based on the model, and so is a decrease in clutch engagement pressure from an initial pressure using the relationship:

$$\Delta P = \Delta \tau \div (\mu_f A_f)$$

where $\tau_t$ is the total torque, $\tau_a$ is the asperity torque, $\Delta\tau$ is the additional torque from the model, $A_f$ is the effective friction area of the clutch, and $\mu_f$ is the corresponding coefficient of friction. $\Delta P$ is subtracted from the initial pressure to create an attenuated pressure that, as applied for clutch engagement, would result in lower torque.

Figure 5:
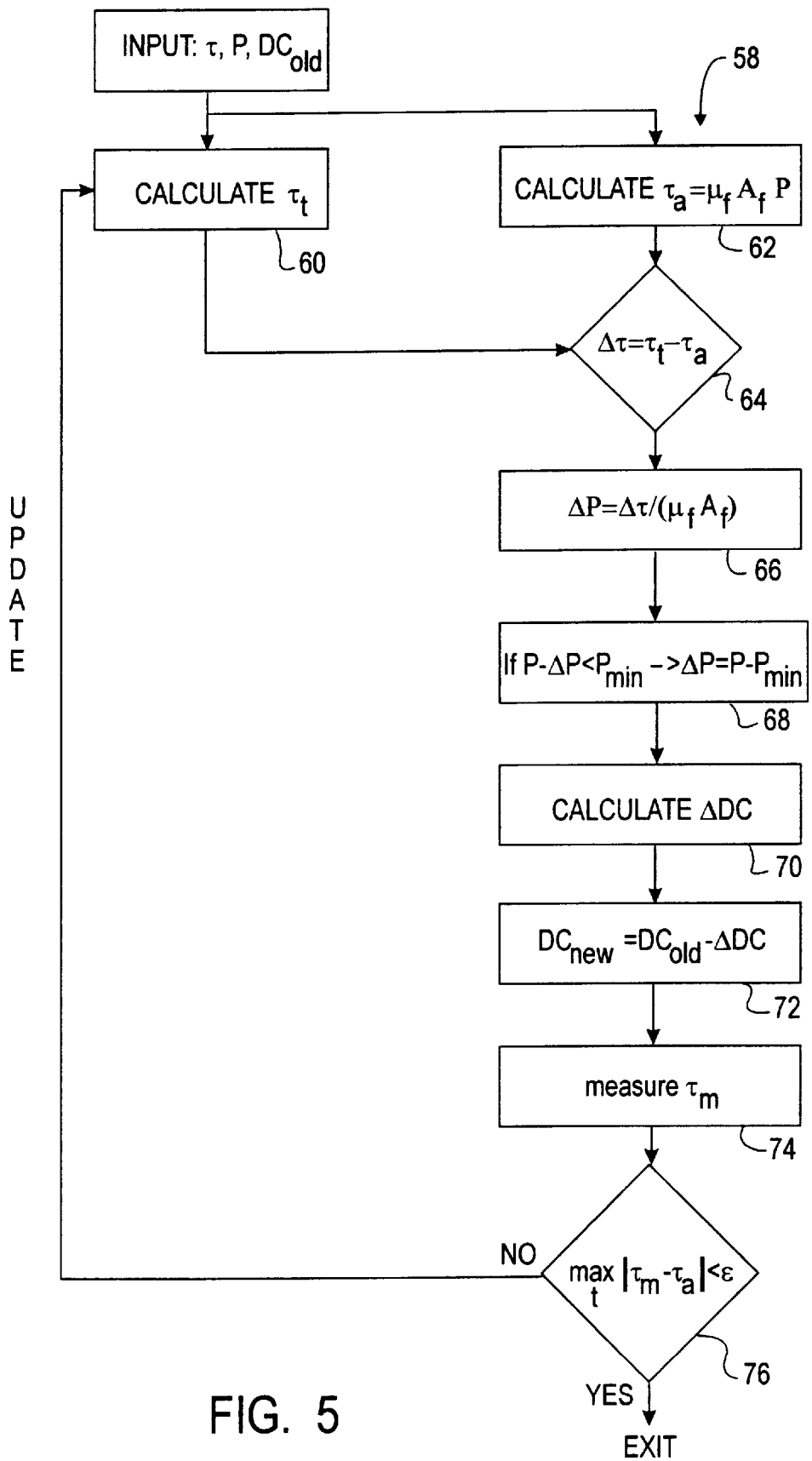
FIG. 5 is a flow diagram of a representative software process for executing an algorithm according to inventive principles.

FIG. 5 shows a flow diagram 58 of an algorithm executed by an associated processor to perform the calculations just mentioned, as represented by steps 60, 62, 64 and 66, as marked. For setting a lower limit of actual pressure applied, a step 68 tests the calculation of step 66 to assure that the result exceeds some minimum pressure $P_{min}$. If the result does not exceed that minimum, then $P_{min}$ is the applied engagement pressure.

Because it is an electric signal that represents the calculated pressure that is to be applied for the engagement, a step 70 calculates an appropriate reduction for that signal, a voltage reduction $\Delta DC$, to be subtracted from an initial voltage $DC_{old}$ to which the initial pressure corresponded. A subtraction step 72 performs the subtraction to yield a result $DC_{new}$ as the signal applied for engagement. The torque $\tau_m$ resulting from application of the signal $DC_{new}$ is either measured, or estimated from an overall powertrain model, at a step 74. A measurement of the torque $\tau_m$ may comprise several measurements taken over a time interval.

A step 76 then computes the absolute value of the difference between the measured, or estimated, torque $\tau_m$ and a desired torque $\tau_a$. In the case of a measurement comprising several measurements taken over a time interval, step 76 may process each of the several measurements individually to ascertain several absolute values, each of which is compared to a defined amount $\epsilon$. This concept can be further extended to include appropriate mathematical norms, such as $H_2$ and $L_1$. If no absolute value calculation exceeds the defined amount, then the algorithm does not iterate because a suitable engagement pressure for producing desired torque has been obtained. On the other hand, if an absolute value is less than the defined amount, then the algorithm does iterate, using a new total torque value $\tau_t$.

The algorithm iterates until eventually step 76 is satisfied. In this way the torque may be controlled during high fluid viscosity conditions. During the process, the maximum total torque should approximate the maximum total torque occurring after the vehicle has been warmed up and the fluid is less viscous.

While a presently preferred embodiment has been illustrated and described, it is to be appreciated that the invention may be practiced in various forms within the scope of the following claims. Principles of the invention are applicable to wet band torque control.

What is claimed is:

1. In an automotive vehicle having an engine that delivers torque to driven wheels via a drivetrain that has a selectively engageable and disengageable clutch comprising a mechanism that engages in response to clutch engagement pressure that is a function of a control signal, the mechanism including a hydraulic fluid interface through which torque is transmitted and which causes relatively larger torque to be imposed on the engine during clutch engagement occurring when the hydraulic fluid is relatively more viscous and relatively smaller torque to be imposed on the engine during clutch engagement occurring when the hydraulic fluid is relatively less viscous, a method for securing closer correspondence between torque imposed on the engine during clutch engagement that occurs when the hydraulic fluid is relatively more viscous and torque imposed on the engine during clutch engagement that occurs when the hydraulic fluid is relatively less viscous, the method comprising:

creating a model that defines torque imposed on the engine during an engagement that occurs when the hydraulic fluid is relatively more viscous;

selecting a torque value for use in calculating a reduction in clutch engagement pressure that will secure closer correspondence between torque imposed on the engine during a clutch engagement that occurs when the hydraulic fluid is relatively more viscous and torque imposed on the engine during a clutch engagement that occurs when the hydraulic fluid is relatively less viscous;

calculating the clutch engagement pressure reduction for the selected torque value; and adjusting the control signal as a function of the calculated clutch engagement pressure reduction.

2. The method as set forth in claim 1 in which the step of calculating the clutch engagement pressure reduction for the selected torque value comprises calculating a torque reduction by subtracting from total torque a torque equal to the product of P, $A_f$, and $\mu_f$ where P is an initial pressure based on a desired torque and a neglect of viscous effects at the interface, $A_f$ is the effective friction area of the clutch, and $\mu_f$ is the corresponding coefficient of friction, and then calculating the corresponding clutch engagement pressure reduction.

3. The method as set forth in claim 2 in which the step of calculating the corresponding clutch engagement pressure reduction comprises dividing the torque reduction by the product of $A_f$ and $\mu_f$.

4. The method as set forth in claim 3 including the steps of determining torque resulting from application of the reduced pressure, and comparing the determined torque to a desired torque.

5. The method as set forth in claim 4 including iterating the recited steps using a new calculated value for total torque.

6. The method as set forth in claim 4 in which the step of determining torque resulting from application of the reduced pressure comprises measuring torque resulting from application of reduced pressure.

7. In an automotive vehicle having an engine that delivers torque to driven wheels via a drivetrain that comprises a selectively engageable and disengageable clutch comprising a mechanism that engages in response to clutch engagement pressure that is a function of a control signal, the clutch including a hydraulic fluid interface through which torque is transmitted and which causes relatively larger torque to be imposed on the engine during clutch engagement occurring when the hydraulic fluid is relatively more viscous and relatively smaller torque to be imposed on the engine during clutch engagement occurring when the hydraulic fluid is relatively less viscous, a system for securing closer correspondence between torque imposed on the engine during clutch engagement that occurs when the hydraulic fluid is relatively more viscous and torque imposed on the engine during clutch engagement that occurs when the hydraulic fluid is relatively less viscous, the system comprising:

a processor that provides the control signal including an addition branch for shaping the control signal as the control signal is rising, a subtraction branch for shaping the control signal as the control signal is falling, and a summing junction for algebraically summing the signal outputs of the addition and the subtraction branches.

\* \* \* \* \*